INVENTOR.
HARRY L. BOCHMAN, JR.
BY
ATTORNEYS.

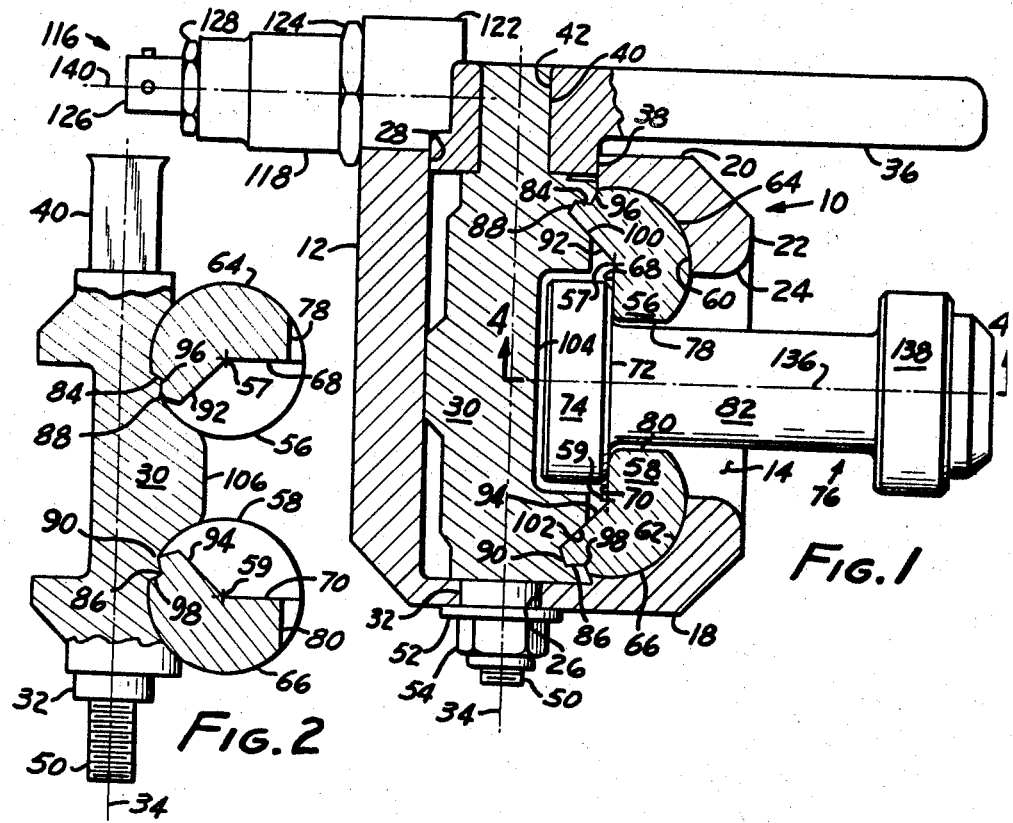
Fig.1
Fig.2
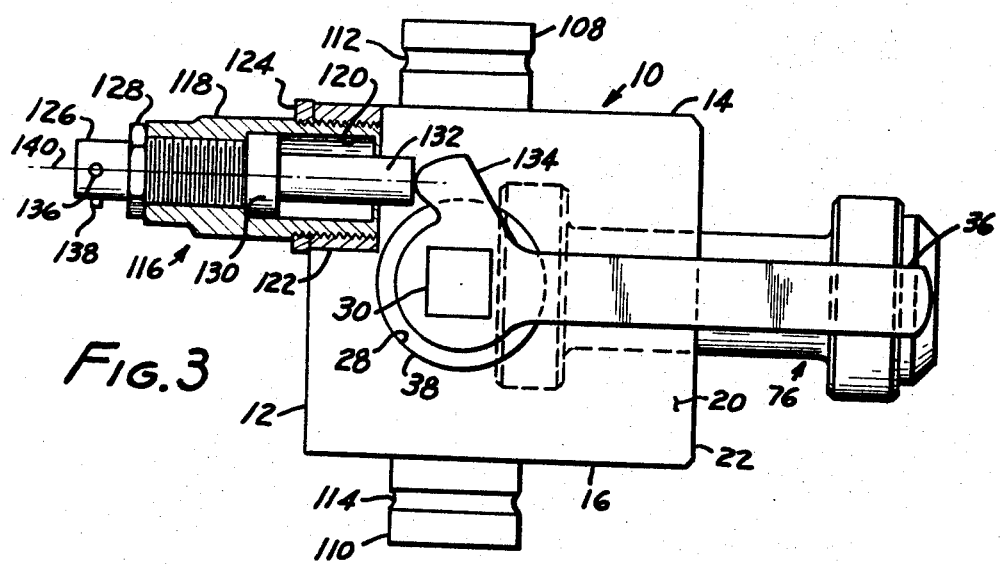
Fig.3
INVENTOR.
HARRY L. BOCHMAN, JR.
BY
ATTORNEYS.

United States Patent Office 3,437,291
Patented Apr. 8, 1969

3,437,291
CATAPULT RELEASE MECHANISM
Harry L. Bochman, Jr., Seal Beach, Calif., assignor to Hi-Shear Corporation, Torrance, Calif., a corporation of California
Filed Nov. 22, 1966, Ser. No. 596,268
Int. Cl. B64f 1/06
U.S. Cl. 244—63    23 Claims

ABSTRACT OF THE DISCLOSURE

A holdback mechanism for holding a release bar includes a housing having a cavity, and lock segments forming an opening through the housing into the cavity. Fast lead worms on a shaft are engaged to the lock segments so that when the shaft is rotated, the lock segments are moved between an open and a closed position. The lock segments hold a head of the release bar when the lock segments are in a closed position. An ordnance device may be provided for operating the lock segments by remote control.

The release bar preferably has a shank having separable means carried thereon and adapted to separate when subjected to a predetermined tension force. Delay means is supported by the release bar to provide a delay in the release of the release bar.

---

This application relates to a release bar holdback mechanism and to a release bar having a delayed release, both of which are useful in the launching of aircraft from catapults.

Release bars are useful in applications where it is desired to hold an object such as an aircraft or a stores at a retained position in a catapult until a predetermined force is exerted and then to release the object in such a manner as to keep to a sensible minimum the shock load on the object. To accomplish these objectives, a release bar is connected at one of its ends to the object and at the other of its ends to a stationary structure. When the catapult exerts a predetermined tensile force on the release bar the bar breaks in tension, thereby releasing the object.

Such release bars are particularly useful for releasing aircraft by catapult-assisted takeoff from runways of limited length such as aircraft carriers. For example, one end of the release bar may be anchored to the deck of an aircraft carrier and the other end may be connected to an aircraft to be launched. A catapult takeoff mechanism exerts a forward force on the aircraft relative to the carrier deck. This force is transmitted to the release bar which is holding back the aircraft. When the force reaches a predetermined value that is large enough for takeoff, the release bar breaks and the catapult mechanism releases the aircraft, thereby assisting the aircraft in takeoff. By holding back the aircraft until the predetermined force level is reached, there is assurance that the aircraft will have all the assistance it needs.

When the release bar breaks in tension, the released force could produce a shock load with a sharp peak in the form of a sudden jolt on the aircraft which can damage delicate instruments in the aircraft. An object of the present invention is to provide a release bar which breaks when subjected to a predetermined tension force but which is provided with a delay means to suppress the shock of the break.

Another problem area in existing techniques for releasing objects with release bars resides in the removal of an expanded release bar from the holdback mechanism. Before another craft can be launched, the release bar must be removed and replaced with a new one. This invention has as one of its objects the provision of a holdback mechanism having a movable lock means whereby the expended release bar may more readily be removed.

Another object of the present invention is to provide the holdback mechanism with an ordnance device whereby the lock means may be remotely opened in case of emergency, for example if the release bar should fail to break in tension.

According to the present invention a catapult release mechanism is provided with a holdback mechanism for holding back a release bar. The holdback mechanism comprises a housing having a cavity for receiving a head of the release bar. The housing is secured to a stationary structure. Lock means is supported by the housing and forms an opening into the cavity. Means is provided for moving the lock means between an open and a closed position. When the lock means is in the open position, the head of the release bar is permitted to pass through the opening, and when the lock means is in a closed position the lock means is adapted to abut the head of the release bar adjacent the shank of the release bar. The shank of the release bar is adapted to separate under tension and delay means is supported by the body of the release bar. When one head is held in the cavity of the holdback mechanism and a predetermined tensile force is applied to the other head, the shank separates, transferring the force to the delay means. The delay means is sufficiently ductile and so proportioned and arranged that a change in shape occurs as the result of the applied force, producing a delay in release because of the time it takes to accomplish the change in shape. When the delay means separates, the object is released. The lock means on the holdback mechanism may thereafter be moved to its open position to facilitate removal of the expended release bar and insertion of a replacement release bar.

According to a preferred but optional feature of this invention, an ordnance device is mounted to the housing for moving the lock means to its open position, whereby the release bar may be released by remote control in the event of an emergency, for example a failure of the release bar to break in tension.

According to yet another preferred but optional feature of this invention, a lock surface is provided on the lock means to hold the lock means in its closed position.

The above and other features of this invention will be fully understood from the following detailed description and the accompanying drawings, in which:

FIG. 1 is a side elevation partly in cross-section of a holdback mechanism holding a release bar therein, both according to the preferred form of the present invention;

FIG. 2 is a fragmentary view of a portion of the holdback mechanism illustrated in FIG. 1 with certain parts in another operating position;

FIG. 3 is a top view of the holdback mechanism illustrated in FIG. 1;

Figure 4:
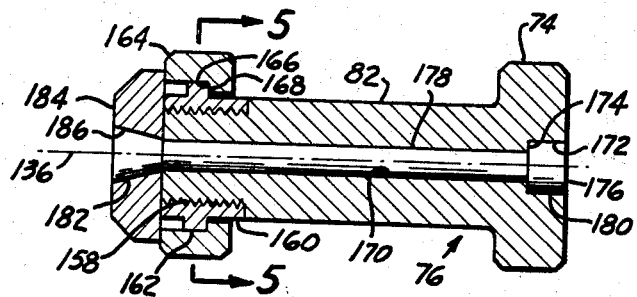
FIG. 4 is a side-view elevation in cutaway cross-section of a release bar taken at line 4—4 of FIG. 1.

Referring to FIGS. 1–3, there is illustrated a holdback mechanism having a housing 10. Housing 10 has outer walls 12, 14, 16, 18, 20 and 22. Opening 24 is formed in wall 22. Openings 26 and 28 are formed in walls 18 and 20 and are axially aligned along axis 34.

Shaft 30 is journalled in opening 26 by cylindrical bearing surface 32. Square passage 42 in lever handle 36 fits over a square-bodied upper portion 40 of shaft 30. Lever handle 36 is journalled in opening 28 by cylindrical bearing surface 38. The assembled shaft and lever handle are mounted to the housing by lock nut 54 and washer 52 on threaded portion 50 of the shaft so that rotation of lever handle 36 causes rotation of shaft 30 about axis 34.

Lock segments 56 and 58 are supported within housing 10 so as to rotate about their respective axes 57 and 59, the ends of which are shown in FIG. 1, the axes being normal to the plane of the drawing so that lock segments 56 and 58 rotate about their respective axes in the plane of the drawing. Bearing surfaces 60 and 62 on housing 10 support surfaces 64 and 66 on lock segments 56 and 58, respectively. Each of the lock segments carries a first surface 68, 70, preferably extending from the axis of the respective lock segment, which are adapted to abut annular shoulder 72 on head 74 of release bar 76 to hold the release bar in the illustrated position. A second surface 78, 80 is formed along a chord of each of lock segments 56 and 58, respectively, to provide clearance for shank 82 of release bar 76 when the lock segments are in the closed position.

Worms 96 and 98 having opposite pitches are formed on shaft 30 to engage grooves 84 and 86 and teeth 88 and 90 of lock segments 56 and 58, respectively. Grooves 84 and 86, teeth 88 and 90 and worms 96 and 98 are mated so that as shaft 30 is rotated about its axis, lock segments 56 and 58 are rotated about their respective axes. By way of example, worms 96 and 98 may extend approximately 120° around shaft 30 and have a sufficient opposite pitch so that when shaft 30 is rotated approximately 120°, the axial pull of worms 96 and 98 on grooves 84 and 86 along axis 34 causes lock segments 56 and 58 to rotate approximately 90° about their respective axes.

When the lock segments are in a closed position as illustrated in FIG. 1, surfaces 100 and 102 on shaft 30 abut surfaces 92 and 94 of the lock segments to prevent the lock segments from further rotation about their respective axes.

Recess 104 is provided on shaft 30 to form a cavity between the shaft and the lock segment to receive head 74 of the release bar. A cam surface 106 is provided on shaft 30 to aid in the expelling of the head of an expanded release bar when the lock segments are in their open position, as illustrated in FIG. 2.

Referring particularly to FIG. 3, a pair of anchor pins 108 and 110 are fixed to walls 14 and 16, respectively, of housing 10. Anchor pins 108 and 110 are adapted to be connected to some fixed structure, such as the deck of an aircraft carrier. Grooves 112 and 114 may be provided on pins 108 and 110 should a cable or loop be used for connecting housing 10 to the fixed structure.

An ordnance device 116 is attached to the top of housing 10 and includes a body 118 having an internal cylinder passage 120. Body 118 is threaded to receptacle 122 attached to housing 10, and retained in place with lock nut 124. A gas release or squib device 126 is threaded into the rear of housing 118 and secured thereto by lock nut 128. Piston 130 is slidably mounted within cylinder 120 and carries a piston rod 132 which protrudes out the open end of cylinder 120. Terminals 136 and 138 are attached to the squib to actuate an explosive charge (not shown) within the squib when energized by an electrical charge.

Lever handle 36 includes an actuator arm 134 projecting at an angle from the rest of lever handle 36. When piston 130 moves to the right in FIG. 3 after initiating the squib, rod 132 strikes arm 134 and turns the handle, thereby rotating shaft 30 about its axis moving lock segments 56 and 58 to their open position.

Figure 5:
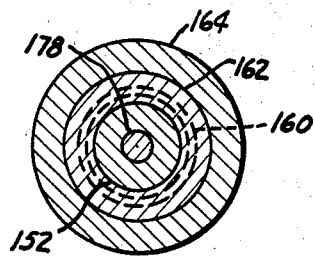
FIG. 5 is a view in cutaway cross-section taken at line 5—5 of FIG. 4.
Figure 6:
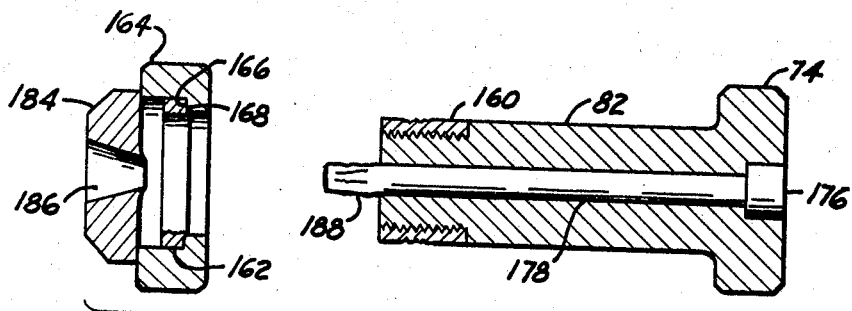
FIG. 6 shows the release bar of FIG. 4 in another condition.

Referring to FIGS. 4 through 6, there is illustrated the preferred form of release bar 76 having a shank 82 and an integral head 74 formed about axis 136. A retainer housing 160 is threaded onto a reduced threaded neck portion 158 of shank 152 and carries external retainer ring 162. Retainer housing 160 and shank 82 are preferably cylindrical about axis 136, having approximately equal diameters. Head 164 is mounted over shank 82 and retainer housing 160 and carries an annular face 166 which overlays and abuts annular face 168 of external retainer ring 162.

An axial passage 170 extends through head 74 and shank 82 and has a counterbore 172 at the end adjacent head 74. Counterbore 172 forms an annular shoulder 174 preferably within head 74. A delay rod 176 having a shank 178 and a head 180 is mounted in the passage so that head 180 abuts annular shoulder 174 of the counterbore.

A retainer nut 184 having an internal tapered or frustoconical surface 186 is fitted over the end of delay rod 176 opposite from head 180, so that the retainer nut abuts head 164. The end of the delay rod is conformed to surface 186. One convenient method of conforming the end of the delay rod to surface 186 is by sledging the end of the rod or clamping the rod to form a tapered or frustoconical surface 182 flaring outwardly from axis 136 and abutting surface 186. Delay rod 176 is axially supported at each end of the release bar by shoulder 174 and retainer nut 184.

By way of example, retainer housing 160 and its integral retainer ring 162 may have a tensile strength of approximately 170,000 p.s.i. and a ductility of approximately 15% elongation in two inches and 30% reduction in cross-section. The ductility of delay rod 176 may be approximately 50% elongation in two inches and 60% reduction in cross-section. A suitable material for construction of the retainer assembly is AISI 4140 steel, and a suitable material for the delay rod is 18-8 stainless steel.

Figure 7:
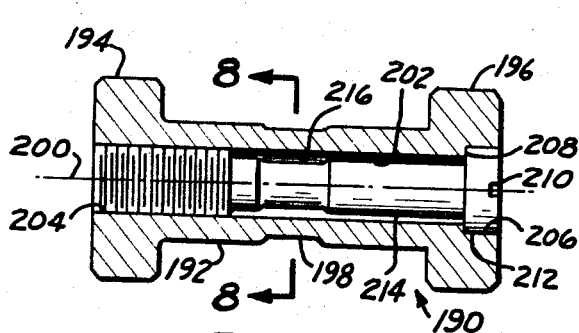
FIG. 7 is a side elevation partly in cross-section of a modified form of a release bar suitable for use in the device of FIG. 1.
Figure 8:
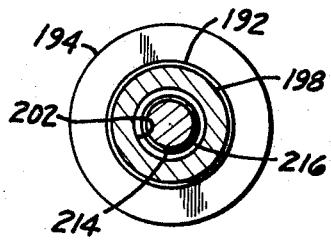
FIG. 8 is a view in cutaway cross-section taken at line 8—8 of FIG. 7.

A modified release bar 190, also suitable for use in the holdback mechanism illustrated in FIGS. 1–3, is illustrated in FIGS. 7 and 8 and has a shank 192, and integral heads 194 and 196 formed at each end of the shank. The shank and heads are preferably cylindrical about axis 200. Reduced portion 198 is formed in shank 192 between and spaced from heads 194 and 196. An axially aligned passage 202 having an internal threaded portion 204 passes axially through bar 190. Passage 202 includes a counterbore 206 forming an annular shoulder 208.

Delay bolt 210 is threaded into threaded portion 204 inside passage 202. Head 212 of the delay rod abuts shoulder 208 of the counterbore. Shank 214 of the delay bolt carries a reduced portion 216 between the threaded portion of the bolt and the head. The delay bolt is supported by the release bar on both sides of reduced portion 198.

Shank 192 and heads 194 and 196 of the release bar may be constructed of the same material as retainer housing 160 in the previous embodiment; and delay bolt 210 may be constructed of the same material as delay rod 176 of the previous embodiment.

In operation, the holdback mechanism housing 10 is anchored to a secure position by suitable anchor means (not shown) connected to anchor pins 108 and 110. Shaft 30 is rotated to its position illustrated in FIG. 2 and head 74 of release bar 76 is passed through the opening provided by the open position of the lock segments and is brought into abutment with cam surface 106 of the shaft. Lever handle 36 is then moved to rotate shaft 30 to its position illustrated in FIG. 1, thereby engaging worms 96 and 98 to grooves 84 and 86 and moving the lock segments to their closed position so surfaces 68 and 70 abut shoulder 72 of release bar 76. Surfaces 68 and 70 hold the release bar in the cavity between the lock segments and recess 104 of the shaft.

With the shaft, the lock segments and the release bar in the position illustrated in FIG. 1, a tension force applied to release bar 76 will tend to produce counterclockwise rotation of lock segment 56 and clockwise rotation of lock segment 58. These rotational tendencies are resisted by the abutment of locking surfaces 100 and 102 on the shaft against surfaces 92 and 94 on the lock segments. The holdback mechanism therefore holds the release bar in position and resists opening due to axial tension forces.

When a predetermined axial tension force is applied to heads 74 and 138 of the release bar illustrated in FIGS. 4 through 6, face 166 of head 164 bears against face 168 of retainer ring 162, thereby fracturing the retainer ring and transferring the tension force to the delay rod. When the delay means receives the tension forces, surface 174 of the counterbore bears against the head of delay rod 176 and retainer nut 184 bears against tapered portion 182 of the delay rod. Delay rod 176 is sufficiently ductile and the tapered portions 182 and 186 of the rod and retainer nut, respectively, are so proportioned and arranged that a change in cross-section of the tapered portion 182 occurs as a result of the applied load until such change is sufficient to permit release of the delay rod from the retainer nut. The time taken to accomplish the change in cross-section of tapered portion 182 produces a delay in the separation of the heads of the release bar. This effect is illustrated in FIG. 6 by the deformed portion 188 of the delay rod. The change in shape is from the frusto-conical shape shown in FIG. 4 to a substantially cylindrical shape shown in FIG. 6 which is substantially equivalent to an extrusion-type change in cross-section requiring time and energy to accomplish it.

The design load for the release bar may be accurately determined from the tensile strength and breaking area of ring 162; and the length of time delay before complete release of the release bar under the axial tension force may be determined from the physical properties and shape of the delay rod. In one typical installation, delay rod 176 provides a delay of approximately 40 milliseconds between the breaking of the retainer ring and the release by the delay rod, which is sufficient to reduce excessive peak loads.

The release bar illustrated in FIGS. 7 and 8 operates similarly to that illustrated in FIGS. 4–6 except that the recess portion 198 of shank 192 separates under a predetermined axial tension force, transferring the force to delay bolt 110 which stretches at its recess 216 until it likewise separates, but by fracturing instead of by extruding. By controlling the physical properties and proportions of the delay bolt, the time delay provided by the delay bolt may accurately be predetermined for a given applied force.

To remove bar 76 from its retained position shown in FIG. 1 handle 36 may be turned to rotate shaft 30 to the position illustrated in FIG. 2. Alternatively, or in case of emergency, ordnance device 116 may be operated by a remote electrical charge energizing terminals 136 and 138, thereby exploding the squib, causing piston 130 and rod 132 to move to the right (as illustrated in the drawings) along their axis 140. Rod 132 forces arm 134 to rotate shaft 30 to its position illustrated in FIG. 2.

After the release bar has separated, and the tension force removed from the head retained in the cavity within the holdback mechanism, shaft 30 may be rotated to the position illustrated in FIG. 2, thereby moving lock segments 56 and 58 to their open position and rotating cam surface 106 into the cavity containing the head of the release bar. The action of cam surface 106 on the head of the retained portion of the expended release bar aids in expelling the retained portion out opening 24 of the housing.

The present invention provides an economical holdback mechanism and release bar having a delay means for delaying the release of axial tension forces, thereby reducing the peak shock of the load. The holdback mechanism provides a safe, reliable holdback of the release bar and is easily operated for removal and replacement of another release bar.

This invention is not to be limited by the embodiments shown in the drawings and described in the description, which are given by way of example and not of limitation.

I claim:

1. In combination: a release bar having first and second heads, a shank interconnecting said heads adapted to separate in tension upon application of a predetermined force to said heads, and delay means supported by said release bar to interconnect said heads and receive a tension force after separation of said shank, said delay means being sufficiently ductile so as to change in cross-section upon the application of tension force to said delay means and being adapted to release the heads from each other upon a predetermined change in cross-section after the shank has parted; and a holdback mechanism having a housing adapted to be anchored to a fixed structure, a cavity in said housing, and lock means defining an opening to said cavity, said lock means having an open position for permitting passage of said first head and said shank through said opening and having a closed position permitting clearance for said shank through said opening, abutment means on said lock means abutting said first head adjacent said shank when said lock means is in its closed position, said first head of said release bar being within said cavity and said second head of said release bar being adapted to be connected to an object to be restrained until released, whereby upon the application of a predetermined tension force between said housing and said second head said shank separates in tension, then transfers said tension force to said delay means, and said delay means thereafter releases said object after a predetermined delay.

2. The combination according to claim 1 wherein said holdback mechanism further includes a shaft mounted in said housing having a first axis about which the shaft may rotate, handle means supported by said housing and connected to said shaft for rotating said shaft about said first axis between a first and a second position, and drive means connecting said lock means to said shaft for moving said lock means between said open and closed position upon rotation of said shaft between the first and second position.

3. The combination according to claim 2 wherein said lock means comprises a plurality of lock segments each having an axis about which it may rotate, said abutment means comprising a first surface on each of said lock segments adapted to abut a portion of the head of the release bar, said drive means being adapted to rotate said lock segments about their axes to the open or closed position, a second surface on each of said lock segments, and a plurality of locking surfaces on said shaft each adapted to contact one of said second surfaces on said lock segments when the lock segments are in their closed position to restrain the lock segments from rotational movement about their respective axes, and wherein said drive means comprises a plurality of worms on said shaft and a groove on each of said lock segments, each of said grooves being engaged by one of said worms.

4. The combination according to claim 1 wherein said release bar further includes an axial passage through said release bar, said delay means being supported in said passage.

5. The combination according to claim 4 further including attachment means mounted on said shank at one end, a retainer housing attached to said attachment means and an external retainer ring integral with said retainer housing, one of said first and second heads being attached to said retainer housing and abutting said external retainer ring, said delay means comprising a retainer nut having a face abutting one end of said release bar, an internal tapered surface in said retainer nut, an elongated object having an external flared portion at one end, said flared portion of said object being contiguous to the tapered surface of the retainer nut, said object having a head at the end opposite said one end supported by said release bar, whereby upon application of said predetermined tension force to said first and second heads said external retainer ring fractures thereby transferring the tension force to said object, and the flared portion changes in cross-section, thereafter to release the first and second heads from each other when the cross-section of the flared portion is sufficiently changed so as to release through said axial passage.

6. The combination according to claim 4 wherein said shank includes an annular reduced portion, said release bar further including an internal threaded portion at one end of said passage, and an axial counterbore at the other end of said passage, said delay means comprising a bolt having a head supported by said counterbore, a shank integral with the head on said bolt, an annular reduced portion and an external threaded portion on the shank on said bolt, said reduced portion of the shank of said bolt being sufficiently ductile as to change in cross-section upon the application of tension force to said bolt, said external threaded portion being engaged to the internal threaded portion in said passage, whereby upon application of said predetermined tension force said shank separates in tension at the reduced portion of said shank and thereafter transfers the tension force to said bolt, and the bolt stretches and thereafter separates in tension at the reduced portion of the bolt so as to release the object.

7. A holdback mechanism for holding and releasing a release bar, which release bar has a head and a shank, said mechanism comprising: a housing having a cavity for receiving the head of a release bar, a shaft mounted in said housing having an axis about which the shaft may rotate; handle means connected to said shaft for rotating said shaft about said axis between a first and a second position; lock means supported by said housing forming an opening into said cavity, said lock means having an open position for permitting passage of the head and shank of the release bar through said opening and having a closed position permitting clearance for the shank of the release bar through said opening; abutment means on said lock means so disposed and arranged as to abut the head of the release bar adjacent the shank when the lock means is in a closed position; and drive means connecting said lock means to said shaft for moving said lock means between said open and closed positions upon rotation of said shaft between said first and second positions, whereby the lock means may be moved from its open position to its closed position thereby holding a release bar having its head in said cavity, and the lock means may be moved from its closed position to its open position thereby permitting removal of the head of the release bar from said cavity; an actuator arm connected to said handle means; an ordnance device mounted to said housing, said ordnance device having a rod adapted to contact said actuator arm and a gas release means adapted to move said rod, whereby upon actuation of said gas release means said rod moves said actuator rod thereby rotating said shaft.

8. A holdback mechanism according to claim 7 wherein said handle means comprises a lever handle connected to said shaft.

9. A holdback mechanism according to claim 7 wherein said ordnance device is so disposed and arranged relative to the actuator arm so as to rotate said shaft to its first position to move said lock means to its open position upon actuation of said gas release means.

10. A holdback mechanism for holding and releasing a release bar, which release bar has a head and shank, said mechanism comprising: a housing having a cavity for receiving the head of a release bar; a shaft mounted in said housing having an axis about which the shaft may rotate; handle means connected to said shaft for rotating said shaft about said axis between a first and a second position; lock means supported by said housing forming an opening into said cavity, said lock means having an open position for permitting passage of the head and shank of the release bar through said opening, and having a second position permitting clearance for the shank of the release bar through said opening; a first surface on said lock means adapted to abut the head of the release bar adjacent the shank when the lock means is in a closed position; drive means connecting said lock means to said shaft for moving said lock means between said open and closed positions upon rotation of said shaft between said first and second positions; a second surface on said lock means; and a locking surface on said shaft adapted to abut said second surface when the lock means is in its closed position to restrain the lock means from moving to its open position, whereby the lock means may be moved from its open position to its closed position thereby holding a release bar having its head in said cavity and the lock means may be moved from its closed position to its open position thereby releasing the head of the release bar through said opening from said cavity.

11. A holdback mechanism according to claim 10 wherein said lock means comprises a plurality of lock segments each having an axis about which it may rotate, each of said lock segments having one said first surface, said drive means being adapted to rotate said lock segments about their axes between their open and closed positions.

12. A holdback mechanism according to claim 11 wherein each of said lock segments has one said second surface, and said shaft has a plurality of said locking surfaces each adapted to contact one of said second surfaces on said lock segments when the lock segments are in their closed position to restrain the lock segments from rotational movement about their respective axes.

13. A holdback mechanism according to claim 11 wherein said drive means comprises a plurality of oppositely wound worms on said shaft, and a groove on each of said lock segments, each of said grooves being engaged by one of said worms.

14. A holdback mechanism according to claim 11 wherein said handle means comprises a lever handle connected to said shaft.

15. A holdback mechanism according to claim 14 wherein said handle means further includes an actuator arm connected to said lever handle, an ordnance device mounted to said housing, said ordnance device having a rod adapted to contact said actuator arm and a gas release device adapted to move said rod whereby upon actuation of said gas release device said rod moves said actuator arm thereby rotating said shaft.

16. A release bar adapted to separate in tension at a predetermined time after application of a predetermined axial tension force, said release bar having first and second heads; a shank interconnecting said heads and adapted to release said heads upon the application of a predetermined tension force to said heads; and delay means supported by said release bar adapted to support said heads and receive a tension force upon the release of said shank; said delay means having a sufficiently ductile portion so as to change in cross-section upon the application of tension force to said delay means, said delay means being adapted to release the heads from each other upon a sufficient reduction in cross-section after the shank has parted, whereby said shank releases said heads upon the application of said predetermined axial tension force and transfers the axial tension force to said delay means, and said delay means thereafter releases said heads from each other after said predetermined delay.

17. A release bar according to claim 16 further including an axial passage through said release bar and wherein said delay means is supported in said passage.

18. A release bar according to claim 17 wherein said delay means comprises a retainer nut having a face abutting one end of said release bar, an internal tapered surface in said retainer nut, an elongated object having an external flared portion at one end, said flared portion of said object being contiguous to the tapered surface of the retainer nut, said object having a head at the end opposite said one end supported by said release bar, whereby upon application of said predetermined tension force to said first and second heads said separable means fractures thereby transferring the axial tension force to said bar, and the flared portion changes in cross-section thereafter to release said first and second heads from each other when the cross-section of the flared portion is sufficiently changed so as to release through said axial passage.

19. A release bar according to claim 18 further including attachment means mounted on said shank at one end, a retainer housing attached to said attachment means and an external retainer ring integral with said retainer housing, one of said first and second heads being attached to said retainer housing and abutting said external retainer ring.

20. A release bar according to claim 17 further including attachment means mounted on said shank at one end, a retainer housing attached to said attachment means and an external retainer ring integral with said retainer housing, one of said first and second heads being attached to said retainer housing and abutting said external retainer ring.

21. A release bar according to claim 17 further including an internal threaded portion at one end of said passage and an axial counterbore at the other end of said passage, said delay means comprising a bolt having a head supported by said counterbore, a delay shank integral with said head of the delay bolt, an annular reduced portion and an external threaded portion on said delay shank, said reduced portion of the shank of the bolt being sufficiently ductile as to change in cross-section upon application of tension force to said bolt, said external threaded portion being engaged to the internal threaded portion in said passage, whereby upon application of said predetermined axial tension force, said shank separates in tension and thereafter transfers the tension force to said bolt, and the reduced portion of said bolt stretches and separates in tension so as to release said heads.

22. A release bar according to claim 21 wherein said shank includes an annular recessed portion.

23. A release bar according to claim 17 wherein said shank includes an annular recessed portion.

References Cited

UNITED STATES PATENTS

| | | | |
|---|---|---|---|
| 2,181,393 | 11/1939 | Crooks | 292—45 XR |
| 2,727,291 | 12/1955 | Hamblin | 244—63 XR |
| 2,942,805 | 6/1960 | Zimnoch | 244—63 |
| 3,185,413 | 5/1965 | Walker | 244—63 |
| 3,304,031 | 2/1967 | Mulquin | 244—63 |
| 3,308,908 | 3/1967 | Bunn | 188—1 |

FOREIGN PATENTS

Ad. 68,845  2/1958  France.

FERGUS S. MIDDLETON, *Primary Examiner.*

PAUL E. SAUBERER, *Assistant Examiner.*